Aug. 23, 1938.  F. DITCHFIELD  2,127,810
FREIGHT CONTAINER
Filed Aug. 31, 1936  3 Sheets-Sheet 1

~INVENTOR~
FRANK DITCHFIELD
By~ Samuel Reuse
ATTY.

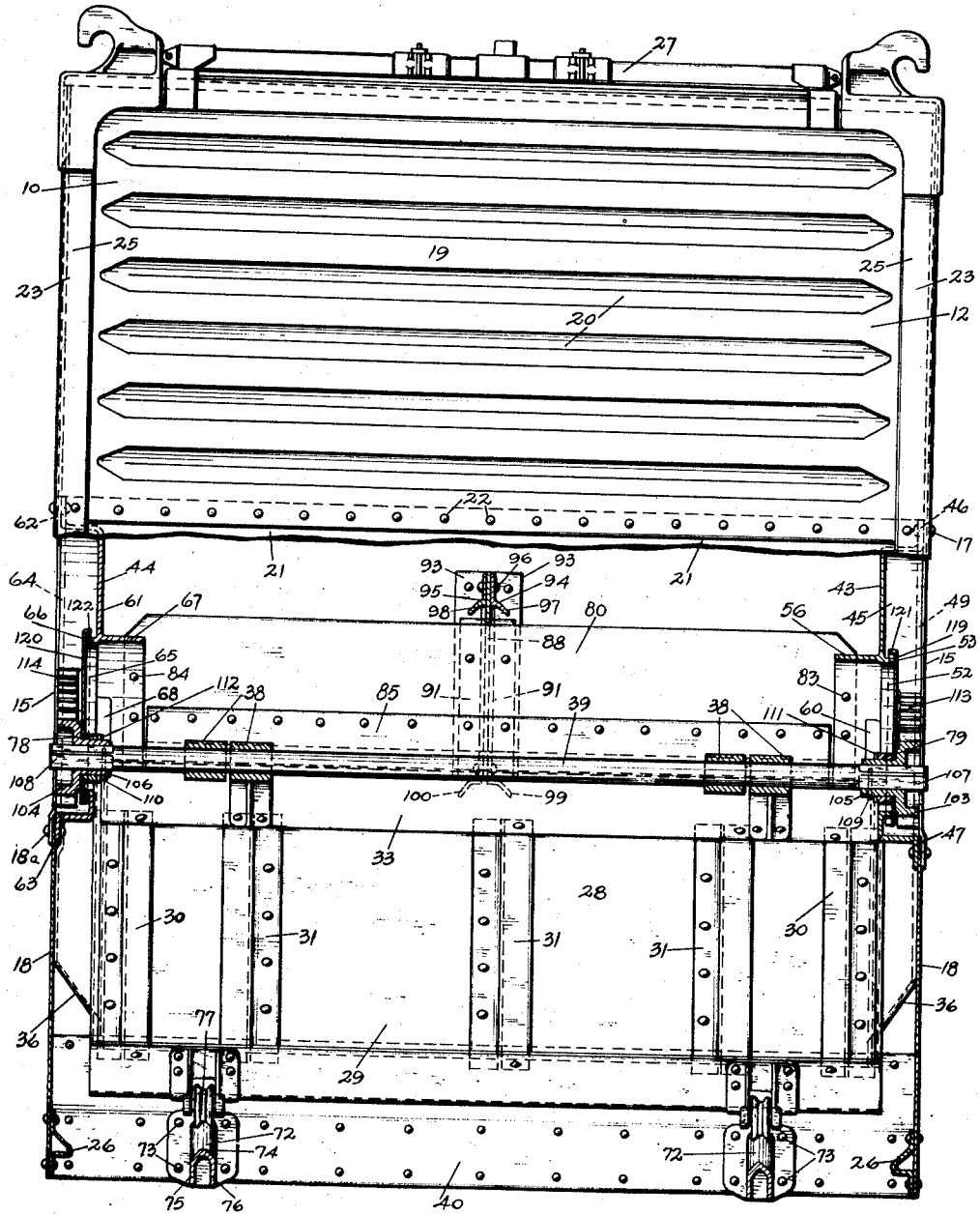

Aug. 23, 1938.                F. DITCHFIELD                2,127,810
                              FREIGHT CONTAINER
                           Filed Aug. 31, 1936            3 Sheets-Sheet 3
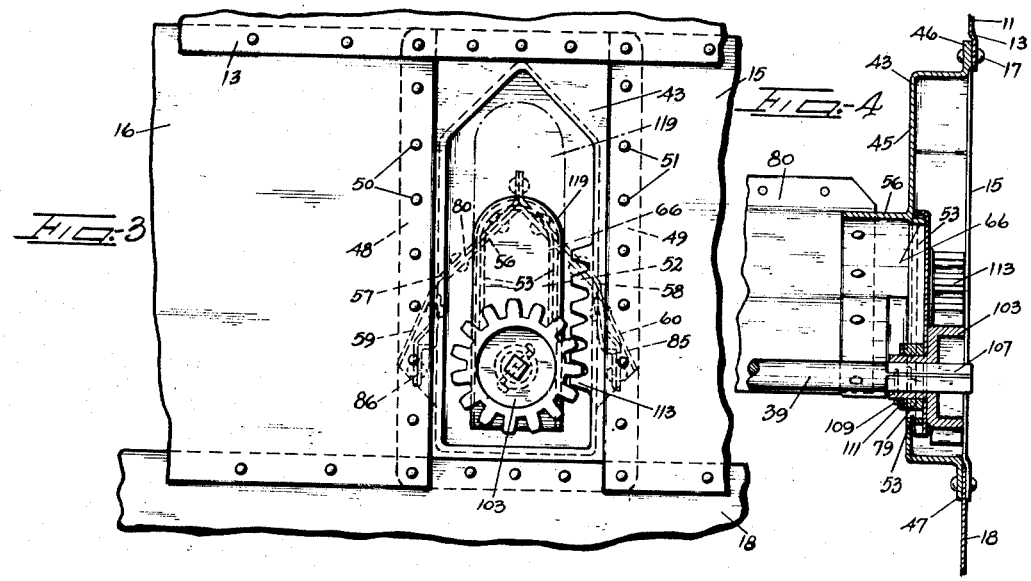
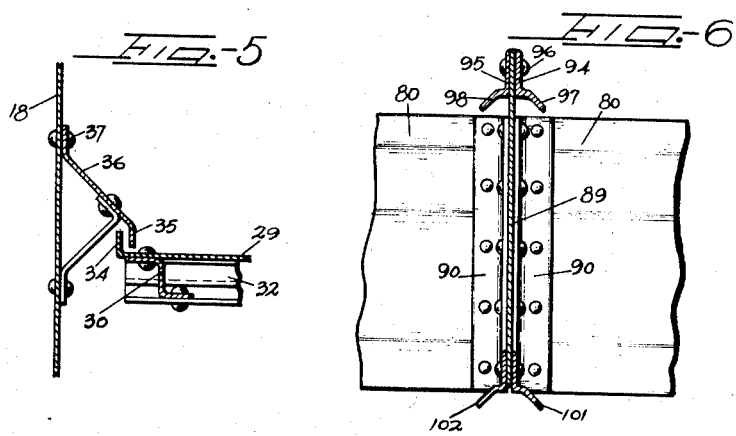
~INVENTOR~
FRANK DITCHFIELD
By~ Samuel Reese
                ATTY.

Patented Aug. 23, 1938

2,127,810

UNITED STATES PATENT OFFICE 2,127,810

FREIGHT CONTAINER

Frank Ditchfield, Cleveland, Ohio, assignor to The Youngstown Steel Door Company, Cleveland, Ohio, a corporation of Ohio Application August 31, 1936, Serial No. 98,637

17 Claims. (Cl. 221—144)

This invention relates to freight containers and is directed more particularly to containers for transporting bulk materials such as lime, lime stone, dolomite, cement, ore and the like.

It is an object of this invention to provide weather-proof freight containers for bulk materials capable of being handled by single drum hoists or cranes, and characterized further by discharge openings which shall obviate convergence of streams of the materials during discharge and by the control of such discharge openings by doors so designed that winding drums and flexible cables or numerous operating shafts and pinions are eliminated, said doors at all times lying within the bottom of the container.

A further object is to provide freight containers for handling of bulk materials having discharge openings controlled by doors actuated by a single operating shaft while eliminating flexible operating connections between said shaft and the doors.

A further object is to provide freight containers for handling bulk materials having discharge openings controlled by doors pivotally connected to a common operating shaft.

A further object is to provide containers as characterized in the paragraph immediately above in which the operating shaft moves vertically in the actuation of said doors.

A further object is to provide bulk material freight containers having doors for controlling discharge openings wherein the upper ends of the doors are pivotally connected to a common operating shaft from which the doors diverge downwardly into engagement with opposite walls of the container.

A further object is to provide freight containers for handling bulk materials having discharge openings controlled by doors the upper ends of which are pivotally connected to a single operating shaft mounted for vertical movement in said containers, said doors swinging toward each other to expose vertical discharge openings.

A further object is to provide bulk material freight containers having discharge openings controlled by doors, the lower ends of which are supported for movement upon members extending between and secured to opposite walls of the containers and serving as reinforcement and bases for the containers.

A further object is to provide bulk material freight containers having discharge openings controlled by doors arranged in downwardly diverging relationship, the upper ends of the door being pivotally connected to slot mounted means operable from the outside of the containers for actuating the doors and the lower ends of the doors bearing against opposite walls of the container when in closed position.

A further object is to provide bulk material freight containers having discharge openings controlled by doors, the upper ends of which are pivotally connected to an operating shaft movable in vertical guideways provided in opposite walls of the container, the doors being associated with a shaft so that the latter is substantially centered in the vertical guideways and out of engagement with the lower ends of the slots.

A further object is to provide bulk material freight containers having doors in the bottoms thereof arranged in downwardly diverging relationship, the upper ends of the doors being pivotally connected to means operable from the outside of the containers, the doors being designed to be completely interchangeable.

With the above enumerated objects in view and others which will become clear as the description of the invention proceeds the instant invention embodies the novel structure and combination of parts hereinafter described and more particularly pointed out and defined in the appended claims.

In the drawings forming part of this specification:

Figure 2 is a view partly in elevation and partly in section taken on line 2—2 of Figure 1.

Figure 3 is a fragmentary elevation looking at the pinion and rack arrangement from the outside of the container.

Figure 4 is an enlarged view of a part of the structure shown in Figure 2.

Figure 5 is a fragmentary sectional view taken on line 5—5 of Figure 1.

Figure 6 is a fragmentary sectional view taken on line 6—6 of Figure 1.

Figure 1:
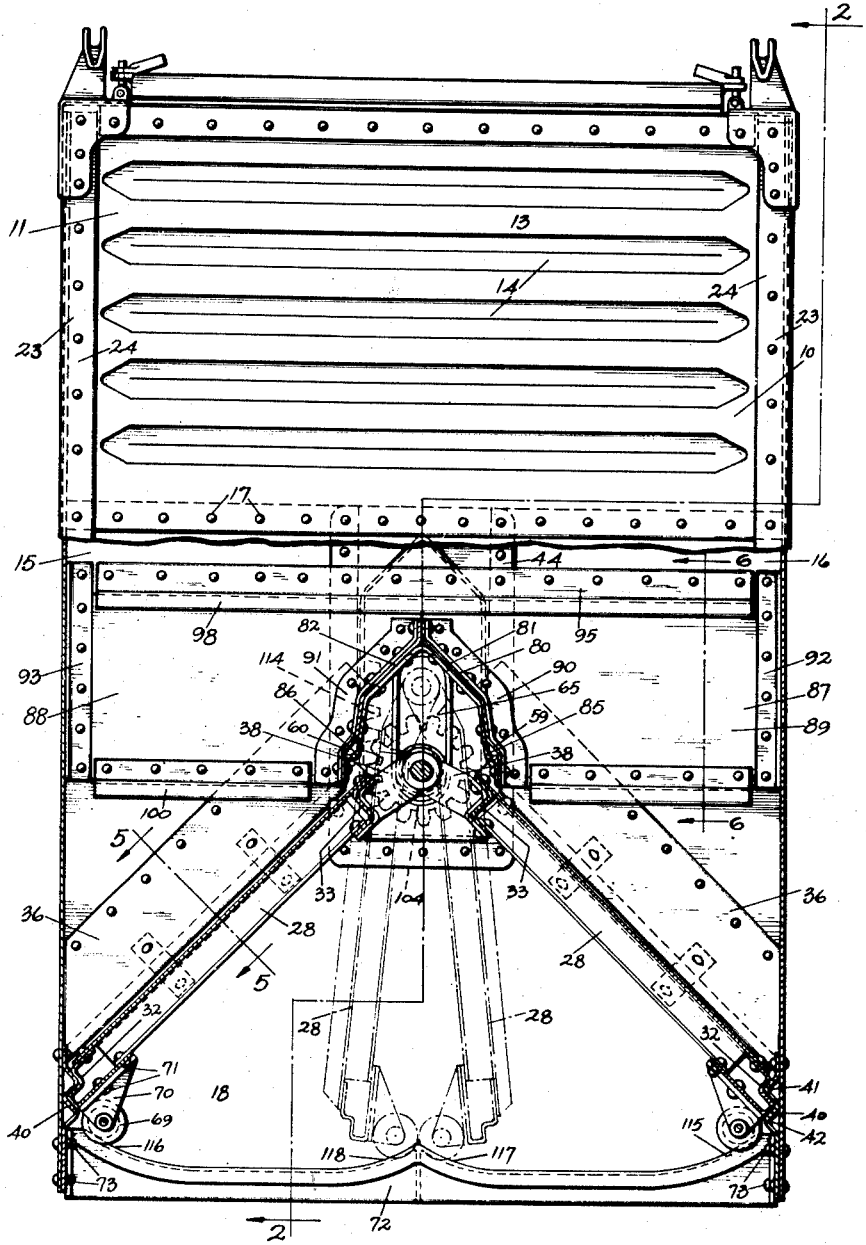
Figure 1 is an elevation of a freight container for handling bulk materials parts being broken away in order to more clearly illustrate the invention.

Referring to the drawings in which the preferred embodiment of the invention is illustrated the numeral 10 designates the freight container as a whole. With reference to Figures 1 and 2 of the drawings in which end and side views of the containers are illustrated, it will be seen that the end walls 11 are of similar construction, and the side walls 12 are of similar construction. Each end wall 11 comprises an upper metallic sheet 13 formed with a plurality of spaced horizontal corrugations 14 which terminate within the edges of the sheet so as to leave flat margins.

It embodies additionally intermediate walls 15 and 16 spaced apart for a purpose which will hereinafter appear. The upper margins of the intermediate sheets 15 and 16 are secured to the lower margins of the upper sheet 13 as by a horizontal row of rivets 17. A bottom sheet 18 having its upper margin secured to the lower margins of the intermediate sheets as by means of a horizontal row of rivets 18A completes the sheet structure of each end wall.

It will be observed that the intermediate and bottom sheets of the end wall structure are illustrated as being plain. It is to be understood however that all of the sheets may be corrugated if desired, or they may all be plain, or any combination of plain and corrugated sheets may be utilized.

Each side wall 12 embodies an upper sheet 19 formed with a plurality of spaced horizontal corrugations 20 terminating within the edges of the sheet. The side wall 12 comprises as well a bottom sheet 21, the upper margin of which is fastened to the lower margin of the upper sheet 19 as by means of rivets 22. While the bottom sheet 21 is illustrated as being plain it may be provided with horizontal or vertical corrugations if desired. Moreover the upper sheet 19 may be plain.

The side and end walls are secured together so as to provide a body rectangular in cross-section by means of corner posts 23, the legs 24 of which are riveted to the end walls 11 while the legs 25 are secured to the side walls 12. The lower margins of the end walls are briefly reinforced by means of the members 26.

The wall structure above described comprises the body of the container. The opening at the upper end of the body may be closed by closure means indicated generally at 27. Any desired construction of closure means may be utilized for this purpose, it being only necessary to insure weather tight closure for the opening in the top of the container.

The bottom of the body of the container is adapted to be closed by means of a plurality of doors 28, each of which extends substantially from end to end of the container. The doors are so designed as to be interchangeable and each comprises a metallic sheet 29 reinforced by means of a plurality of end Z bars 30 and intermediate Z bars 31 secured as by means of rivets to the underside of the sheet. Each of the doors 28 embodies a reinforcing member 32 secured to the lower margin of the metallic sheet 29 and to the lower ends of each of the reinforcing Z bars. The reinforcing member is angular in cross-section as clearly shown in Figure 1 of the drawings for a purpose which will later appear. The upper margin of the door is reinforced by means of a Z shaped member 33 arranged with its flanges underlying the metallic sheet 29 and the Z shaped door stiffener, or reinforcements 30 and 31. The metallic sheet is secured to one of the flanges of the Z shaped reinforcing member 33 as by means of rivets, while the reinforcing members 30 and 31 are secured to the other flange of the Z shaped member 33 as by means of rivets. Each side of the metallic door sheet 29 is provided with a flange 34 adapted to coact with the flange 35 of an angular plate member 36 secured as by means of rivets 37 to the bottom sheet 18 of the end wall 11. There is thus provided a weatherproof construction for the sides of the doors 28 and a barrier for preventing loss of material.

Hinge-butts 38 are fastened to the upper portions of the doors 28, these hinge-butts being arranged as clearly illustrated in Figure 2 of the drawings so that the doors are completely interchangeable.

The doors 28 are adapted to be mounted upon a shaft 39 which extends between the end walls 11 of the container and through the hinge-butts 38 of the doors. As clearly appears in Figure 1 of the drawings the doors 28 are arranged upon opposite sides of the shaft 39 and in the closed position thereof the doors diverge downwardly. In this position of the doors the lower reinforcing members 32 cooperate with corrugated members 40 fastened to the lower portions of the side walls 12 in order to provide a weather tight construction for the lower ends of the doors. To this end the corrugations 41 and 42 of the members 40 cooperate with the angular formation of the lower reinforcing members 32, as clearly shown in Figure 1 of the drawings.

Similar members 43 and 44 are secured in opposed relationship to the end walls 11 of the container. Referring to the casting 43 it will be seen to comprise a body portion 45 provided with offset horizontal flanges 46 and 47 secured to the end walls by means of the rivets 17 and 18a respectively utilized for the purpose of fastening the intermediate sheets of the end walls to the upper and lower sheets thereof. Similarly offset vertical flanges 48 and 49 are provided on the body portion 45 of the casting these flanges being riveted to the spaced margins of the intermediate end sheets 15 and 16 as by means of the rivets 50 and 51. The interval between the intermediate end sheets 15 and 16 thus provides for the disposition of the castings 43 and 44. The casting 43 is provided with a slot 52 forming a guideway through which the adjacent end of the shaft 39 extends. The slot 52 is defined by means of an outwardly extending flange 53. Extending inwardly from the body portion 45 of the casting 43 is a flange 56 of substantially inverted V shape in contour, the purpose of which will hereinafter be described.

A portion of each of the branches 57 and 58 of the inverted V shaped flange 56 is offset as indicated at 59 and 60. The offset portions of the branches of the flange 56 provide the space for the reception of the weather-proofing flanges 34 at one end of each of the doors 28 as these doors move toward open position.

The casting 44 is of susbtantially the same construction as the casting 43. It thus presents a body portion 61 formed with offset upper and lower horizontal flanges 62 and 63 and offset vertical flanges such as 64. These flanges are fastened to the corresponding end wall of the container as hereinabove described for the fastening of the casting 43. The casting 44 is provided with a slot 65 forming a guideway and is defined by the outwardly extending flange 66 formed on the body portion of the casting. An inwardly extending flange 67 of the same contour as the inwardly extending flange 56 on the casting 43 is formed on the casting 44. Additionally the branches of the inverted V shaped flange 67 are offset as indicated at 68 in order to provide space for the reception of the weather-proofing flanges 34 at the other sides of the doors 28 as these doors move to open position. It will be understood that the castings 43 and 44 are disposed opposite each other so that the slots 52 and 65, as well as the inwardly directed substantially inverted V shaped flanges 56 and 67, are in alignment. The other end of the shaft 39 extends through the slot 65 in the casting 44.

As clearly appears from Figures 1 and 2 of the drawings the shaft 39 is spaced above the bottom of the slots 52 and 65 when the doors 28 are in their closed position. Inter-engagement between corresponding members 40 and 37 is constantly maintained when the doors are closed, under the influence of the weights of the material and the doors which impose a force on the doors constantly tending to cause their divergence and hence establish pressure of the doors against the members 40. Since the shaft is spaced above the bottom of the slots 52 and 65 it does not interfere with this tendency. The rollers 69 which are carried by brackets 70 secured to the lower margins of the doors as by means of rivets 71 serve, therefore, in cooperation with the track 72 merely to guide the doors during opening and closing movements. The pins upon which the rollers are mounted are substantially relieved of the weights of the material on to the doors. The tracks 72 extend between and are fastened to the side walls 12 of the container as by means of rivets 73 and function additionally by reason of their securement to the side walls to tie in said walls against bulging stresses occasioned by the loads in the container. It will be apparent, of course, that the rollers may be used to carry the load to the tracks if desired, altho in this case the pins will be subjected to stress resulting from the combined weights of the material and the doors.

The section of each of the tracks is clearly indicated in Figure 2 of the drawings being comprised of an inverted V shaped upper portion 74 having downwardly extending spaced vertical flanges 75 and 76. The rollers 69 ride upon the inverted V shaped portion 74 of the track and to this end the rollers are grooved as indicated at 77. The tracks 72 function additionally by reason of their securement to the side walls of the container to tie in said side walls against bulging stresses occasioned by the load within the container. Moreover, the tracks 72 constitute the base for the container and for this purpose are briefly extended below the walls of the container, as illustrated in Figure 1 of the drawings.

It will thus be seen from the foregoing description that the shaft 39 is maintained above the bottom of the slots 52 and 65, and that by virtue of the symmetrical arrangement of the doors relative to the shaft, the latter is substantially centered in the slots so as to reduce substantially the friction against the sides of the slots. The possibility of frictional engagement with the sides of the slots is further minimized by the employment of bushings 78 and 79 mounted upon the hubs of pinions secured upon the shaft as hereinafter described.

In order to protect the shaft 39 a protecting hood 80 is utilized. This hood, as clearly appears in Figure 1 of the drawings, is of the same contour as the inverted V shaped inwardly extending flanges 56 and 67 formed on the castings 43 and 44. The hood 80 is briefly comprised of a pair of properly shaped plates 81 and 82 extending between the flanges 56 and 67 and secured thereupon as by means of rivets 83 and 84. It will be clear from Figure 1 of the drawings that the protecting hood 80 provides sufficient space to accommodate the vertical movement of the shaft 39. The lower edges of the hood 80 are reinforced by means of angular members 85 and 86. In addition to its function as a protecting hood for the operating shaft it will be clear that it provides a girder secured to the end walls of the container and effective to resist bulging stresses upon the end walls.

A diaphragm 87 extends between and is secured to the side walls 12 of the container to afford additional reinforcement against bulging stresses. The diaphragm 87 is preferably formed of a plurality of plates 88 and 89, each of which extends from the hood 80 to the corresponding side wall. The edges of the plates 88 and 89 are, therefore, preferably shaped to conform to the contour of the plates 81 and 82 of the hood. Securement of the plates 87 and 88 to the hood is obtained by means of angular members 90 and 91, also shaped to conform to the contour of the plates of the hood. Attachment of the plates 88 and 89 to the walls 12 of the container is effected by means of angles 92 and 93. The upper edge of the diaphragm 87 is reinforced by continuously extending angle members 94 and 95 secured upon opposite sides of the diaphragm 87 as by means of rivets 96.

As clearly appears from Figures 2 and 5 of the drawings the angle members 94 and 95 have their legs 97 and 98 deformed so as to slope downwardly thereby providing shedding surfaces for the material within the container. The lower edge of the diaphragm 87 between the hood and the side walls of the container are reinforced by similarly formed angle members 99 and 100, and 101 and 102. It will be clear from the foregoing described construction that the diaphragm 87 not only reinforces the side walls of the container against bulging stresses but serves additionally to brace the shaft protecting hood against stresses tending to distort said hood.

Mechanism is provided for easily and effectively imparting vertical movement to the shaft 39. This mechanism in the instant embodiment of the invention comprises pinions 103 and 104 mounted upon the end portions of the shaft 39. The pinions 103 and 104 are provided with hubs 105 and 106 which are angular internally to conform to the angular end portions 107 and 108 of the shaft. Each of the pinions is pinned to the shaft by means of the pins 109 and 110. Externally the hubs 105 and 106 of the pinions are cylindrical and the bushings 78 and 79 are rotatably mounted upon these hubs and maintained thereupon by means of washers 111 and 112. The castings 43 and 44 adjacent the openings 52 and 65 provided therein are formed with vertical rows of teeth 113 and 114 with which the pinions 103 and 104 mesh.

It is believed that the operation of the doors 28 will be clear from the foregoing detailed description of applicant's invention. Assuming the doors to be in their closed position, as illustrated in Figures 1 and 2 of the drawings, opening movement thereof in order to discharge the bulk material within the container is obtained by sliding a crank upon either of the angular ends 107 and 108 of the shaft. Assuming that the crank is engaged with the end 107 of the shaft a rotation thereof and of the shaft in a clock-wise direction will impart rotation to the shaft and to the pinions 103 and 104 mounted thereon. Since the pinions are meshed with the teeth 113 and 114 provided on the castings 43 and 44, the motion of rotation of the shaft and pinions will be translated into a vertical movement of the shaft within the hood 80 and the slots 52 and 65 formed in the castings 43 and 44. As the shaft 39 rises vertically the doors 28, which are pivotally mounted upon the shaft, will collapse or move toward each other, the rollers 69 during this movement riding upon the tracks 72. The bottom of the container will thus be open and when the doors assume their fully opened position it will be clear that they provide, together with the walls of the container, vertical openings for the discharge of the material within the container. In addition the position of the doors when open is such that they are protected by the hood 80.

The opening, as well as the closing movement of the doors is facilitated by reason of the conformation of the track longitudinally and the angular disposition of the doors. As best illustrated in Figure 1 of the drawings, the tracks 72 slope upwardly at their ends adjacent the side walls of the container as indicated at 115 and 116 and are provided with upwardly converging sloping portions 117 and 118 which lie on opposite sides of the center line of the tracks. The slope assumed by the doors 28 when they have been opened slightly by operation of the shaft 39 cooperates with the sloping portions 115 and 116 to aid the load within the container to continue the opening movement of the doors. The sloping portions 115 and 116 moreover are so designed as to secure a minimum clearance between the upper surfaces of the doors and the adjacent edges of the hood 80 when the doors are closed to prevent escape of material and to maintain a minimum size of hood and a maximum size of discharge opening on each side of the hood.

In their open position the doors 28 will be disposed as indicated in dot and dash lines in Figure 1 of the drawings, it being apparent that in this position the rollers 69 of the doors will lie upon the slopes 117 and 118 of the tracks 72. When the material in the container has been discharged the doors will by their own weight and by the impetus supplied by the sloping portions 117 and 118 gravitate automatically to their closed position. In this position the slope of the doors is such that when material is loaded upon the doors the weight of said material will tend to force said doors into tight interengagement with the members 40 secured to the side walls of the container. In the movement of the doors it will be clear that the shaft 39 will be substantially centered within the slots 52 and 65, and since the shaft is disposed above the bottom of these slots, in the closed position of the doors it is impossible for the weight of the material acting upon the doors to distort the shaft.

To insure against the possibility of rain or other foreign matter entering the container through the slots 52 and 65 it is preferred to close these slots. This is accomplished preferably by means of metallic plates 119 and 120 formed with inwardly projecting flanges 121 and 122 conforming to and over-lapping the flanges 53 and 66 which define the slots 52 and 65. The plates 119 and 120 are loosely mounted upon the hubs of the pinions 103 and 104, these hubs passing through openings formed in said plates and are disposed between the body of the pinions and the bushings 78 and 79. The plates 119 and 120 are thus constrained to move vertically with the shaft and provide closure for the slots 52 and 65 when the doors 28 are closed and the shaft 39 has reached its lowermost position.

It is to be observed that by the virtue of the construction of the container hereinabove described the discharge of the material from the container is confined substantially within the walls thereof, hence the tendency for dust from the material to escape into the air is greatly minimized. This characteristic is extremely important since in the shipment of unslaked lime for example it prevents escape of lime dust into the air and thereby greatly reduces the number of instances of lime poisoning suffered by workmen.

Manifestly, numerous changes and modifications in the details of the embodiments of the invention disclosed will become apparent to those skilled in the art. It is intended that all such changes and modifications be comprehended within the scope of the invention which is to be limited only by the claims appended hereto.

I claim:

1. A railway container of the character described comprising a body, said body being provided with opposed vertical slots, a shaft extending through said container and said slots, a plurality of doors for the bottom of said body arranged on opposite sides of said shaft, said doors having their upper portions pivotally connected to said shaft and extending downwardly in diverging relationship, the lower portions of said doors having sealing relationship with the body of said container in the closed position of said doors, cooperable means secured to said shaft and said container for imparting vertical movement to said shaft and a hood secured to said body above said shaft in parallel relationship therewith, said hood protecting said shaft and reinforcing said body against bulging stresses.

2. A railway container of the character described comprising a body, said body being provided with opposed vertical slots, a shaft extending through said container and said slots, a plurality of doors for the bottom of said body arranged on opposite sides of said shaft, said doors having their upper portions pivotally connected to said shaft and extending downwardly in diverging relationship, the lower portions of said doors having sealing relationship with the body of said container in the closed position of said doors, cooperable means secured to said shaft and said container for imparting vertical movement to said shaft and opening movement to said doors and means for closing said slots in the closed position of said doors.

3. A railway container of the character described comprising a body, said body being provided with opposed vertical slots, a shaft extending through said container and said slots, a plurality of doors for the bottom of said body arranged on opposite sides of said shaft, said doors having their upper portions pivotally connected to said shaft and extending downwardly in diverging relationship, the lower portions of said doors having sealing relationship with the body of said container in the closed position of said doors, cooperable means secured to said shaft and said container for imparting vertical movement to said shaft and opening movement to said doors and means carried by and movable with said shaft for closing said slots in the closed position of said doors.

4. A railway container of the character described comprising a body, said body being provided with opposed vertical slots, a shaft extending through said container and said slots, a plurality of doors for the bottom of said body arranged on opposite sides of said shaft, said doors having their upper portions pivotally connected to said shaft and extending downwardly in diverging relationship, the lower portions of said doors having sealing relationship with the body of said container in the closed position of said doors and cooperable means secured to said shaft and said container for imparting vertical movement to said shaft, said doors approaching each other in opening movement as said shaft moves upwardly, said doors in open position cooperating with the walls of the container to provide vertical discharge openings on opposite sides of said shaft.

5. A railway container of the character described comprising a body, said body being provided with opposed vertical slots, a shaft extending through said container and said slots, a plurality of doors for the bottom of said body arranged on opposite sides of said shaft, said doors having their upper portions pivotally connected to said shaft and extending downwardly in diverging relationship, the lower portions of said doors having sealing relationship with the body of said container in the closed position of said doors, cooperable means secured to said shaft and said container for imparting vertical movement to said shaft and a hood secured to said body above said shaft in parallel relationship therewith, said hood protecting said shaft and reinforcing said body against bulging stresses, said doors approaching each other in opening movement as said shaft moves upwardly and being disposed below said hood in open position for protection thereby.

6. A container of the character described comprising a body, members secured to said body in opposed relationship, aligned vertical slots formed in said members, a vertical row of teeth provided on said members, a shaft extending through said container and said slots, a plurality of doors for the bottom of said body arranged on opposite sides of said shaft, said doors being pivotally connected to said shaft and extending in downwardly diverging relationship in closed position, said doors in said position having sealing relationship with the body of said container and a pinion mounted on each end of said shaft, said pinions meshing with said teeth of said members for the purpose set forth.

7. A container of the character described comprising a body, castings secured to said body in opposite relationship, flanges on said castings extending inwardly of said container, aligned vertical slots formed in said castings, a vertical row of teeth on each of said castings adjacent to said slots, a shaft extending through said container and said slots, doors for the bottom of said container arranged on opposite sides of said shaft, said doors being pivotally connected to said shaft and diverging downwardly therefrom in closed position, said doors in said position having sealing relationship with the body of said container, a pinion mounted upon each end of said shaft, said pinions meshing with said rows of teeth and a hood secured to said inwardly extending casting flanges, said hood being disposed above and parallel to said shaft.

8. A container of the character described comprising a body, doors for the bottom of said container arranged in downwardly diverging relationship, a common shaft to which said doors are hingedly connected, said shaft being confined to vertical movement of translation and to rotation about its axis, operating means for opening said doors, said means including said shaft and being operable to impart vertical movement thereto, said shaft in the closed position of said doors being supported thereby.

9. A container of the character described comprising a body, said body being provided with opposed vertical slots, a closure for the bottom of said container, means extending through said slots, said closure being pivotally connected to said means, a protecting hood for said means secured to said body above said means, said closure sloping downwardly from said means to said body and having sealing engagement therewith, and a mechanism for imparting vertical movement to said means and opening movement to said closure.

10. A bulk material shipping container of the character described comprising a body, a plurality of doors for the bottom of said body, bearing members on the upper portion of said doors, a shaft journalled in said bearing members, said doors being arranged on opposite sides of said shaft and diverging downwardly therefrom, the lower margins of said doors abutting against the body of said container in closed position and cooperable means secured to said shaft and said body respectively for imparting rotation to said shaft in said bearing members and vertical movement to said shaft and opening movement to said doors.

11. A bulk material shipping container of the character described comprising a body, said body being provided with opposed vertical guideways, a plurality of doors for the bottom of said body, bearing members on the upper portion of said doors, a shaft journalled in said bearing members and extending into said guideways, said doors being arranged on opposite sides of said shaft and diverging downwardly therefrom, the lower margins of said doors abutting against the body of said container in closed position and cooperable means secured to said shaft and said body respectively adjacent to said guideways for imparting rotation to said shaft in said bearing members and vertical movement to said shaft in said guideways and opening movement to said doors.

12. A bulk material shipping container of the character described comprising a body, a plurality of doors for the bottom of said body, bearing members on the upper portion of said doors, a shaft journalled in said bearing members, said doors being arranged on opposite sides of said shaft and diverging downwardly therefrom, the lower margins of said doors abutting against the body of said container in closed position, rollers secured to the lower margins of said doors, tracks for said rollers secured to said body and cooperable means secured to said shaft and said body respectively for imparting rotation to said shaft in said bearing members and vertical movement to said shaft and opening movement to said doors.

13. A bulk material shipping container of the character described comprising a body, a plurality of doors for the bottom of said body, bearing members on the upper portion of said doors, a shaft journalled in said bearing members, said doors being arranged on opposite sides of said shaft and diverging downwardly therefrom, the lower margins of said doors abutting against the body of said container in closed position, rollers secured to the lower margins of said doors, tracks for said rollers secured to said body and cooperable means secured to said shaft and said body respectively for imparting rotation to said shaft in said bearing members and vertical movement to said shaft and opening movement to said doors, said tracks forming the base of said container.

14. A bulk material shipping container of the character described comprising a body, said body being provided with opposed vertical guideways, a plurality of doors for the bottom of said body, bearing members on the upper portion of said doors, a shaft journalled in said bearing members and extending into said guideways, said doors being arranged on opposite sides of said shaft and diverging downwardly therefrom, the lower margins of said doors abutting against the body of said container in closed position and cooperable means secured to said shaft and said body respectively adjacent to said guideways for imparting rotation to said shaft in said bearing members and vertical movement to said shaft in said guideways and opening movement to said doors, said shaft in all positions thereof lying above the bottom of said guideways.

15. A bulk material shipping container of the character described comprising a body, closure means for the bottom of said body, bearing members on the upper portion of said closure means, a shaft journalled in said bearing members, said closure means sloping downwardly from said shaft and establishing sealing engagement with said body in closed position and cooperable means secured to said shaft and said body respectively for imparting rotation to said shaft in said bearing members and vertical movement of said shaft and opening movement of said closure means.

16. A bulk material shipping container of the character described comprising a body, closure means for the bottom of said body, bearing members on the upper portion of said closure means, a shaft journalled in said bearing members, said closure means sloping downwardly from said shaft, means secured to said body, the lower margin of said closure means being conformed to said means, said means engaging said lower margin of said closure means in closed position to provide a seal and to support said closure means and cooperable means secured to said shaft and said body respectively for imparting rotation to said shaft in said bearing members and vertical movement to said shaft and opening movement to said closure means.

17. A bulk material shipping container of the character described comprising a body, a plurality of doors for the bottom of said body, bearing members on the upper portion of said doors, a shaft journalled in said bearing members, said doors being arranged on opposite sides of said shaft and diverging downwardly therefrom, the lower margins of said door abutting against the body of said container in closed position, rollers secured to the lower margins of said doors, tracks for said rollers secured to said body, conformable means secured to said body and to the lower margins of said doors, said means being engaged in the closed position of said doors to support said doors and seal the lower margins thereof whereby to relieve said rollers of the weight of said doors, and cooperable means secured to said shaft and said body respectively for imparting rotation to said shaft in said bearing members and vertical movement to said shaft and opening movement to said doors.

FRANK DITCHFIELD.